(No Model.) 2 Sheets—Sheet 1.

A. F. SCHWALB.
WATER FILTER AND COOLER.

No. 263,599. Patented Aug. 29, 1882.

Witnesses:
Edw. J. Brady
Theo. L. Popp

A. F. Schwalb, Inventor.
By Wilhelm & Bonner,
Attorneys.

(No Model.) 2 Sheets—Sheet 2.

A. F. SCHWALB.
WATER FILTER AND COOLER.

No. 263,599. Patented Aug. 29, 1882.

Witnesses.
Edw. J. Brady
Theo. L. Popp

A. F. Schwalb, Inventor
By Wilhelm & Bonner
Attorneys.

UNITED STATES PATENT OFFICE.

ALPHONS F. SCHWALB, OF BUFFALO, NEW YORK.

WATER FILTER AND COOLER.

SPECIFICATION forming part of Letters Patent No. 263,599, dated August 29, 1882.

Application filed May 2, 1882. (No model.)

*To all whom it may concern:*

Be it known that I, ALPHONS F. SCHWALB, of the city of Buffalo, in the county of Erie and State of New York, have invented new and useful Improvements in Combined Water Filters and Coolers, of which the following is a specification.

This invention relates more particularly to an improvement in domestic water-filters and water-coolers, and has for its object to so construct the filter that it can be readily charged with filtering material, and that the filtering material can be easily renewed, and that all parts of the filter can be cleaned when necessary.

My invention consists, to that end, of the peculiar construction of the filter, which will be hereinafter fully set forth, and pointed out in the claims.

Figure 1:
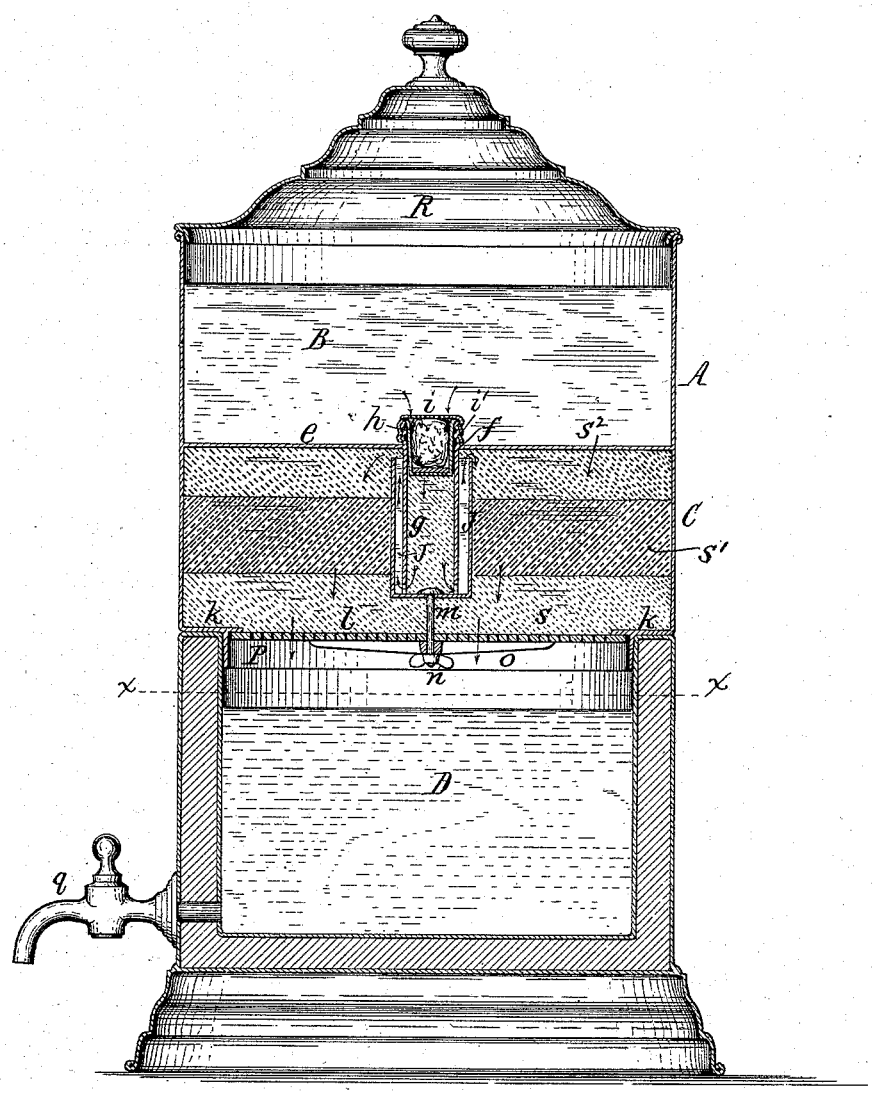
Figure 2:
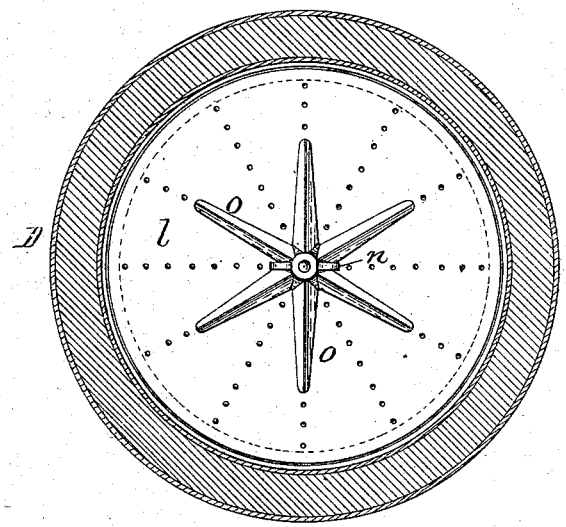
Figure 3:
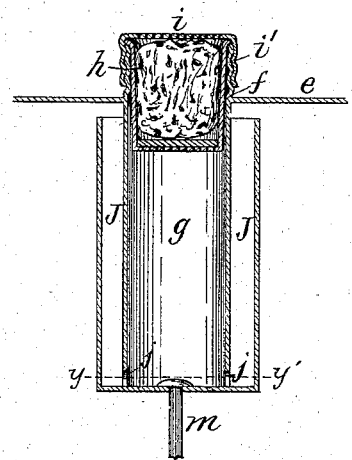
Figure 4:
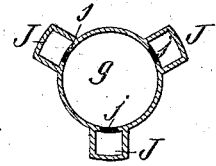

In the accompanying drawings, consisting of two sheets, Figure 1 is a vertical section of my improved filter. Fig. 2 is a horizontal section in line $x\,x$, Fig. 1, looking upward. Fig. 3 is an enlarged sectional view of the filter-tube. Fig. 4 is a horizontal section thereof in line $y\,y$, Fig. 3.

Like letters of reference refer to like parts in the several figures.

The combined filter and water-cooler consists of an upper portion, A, which contains a receptacle or chamber, B, for the water to be filtered, and a chamber, C, for the filtering material, and a lower portion, D, which forms a receptacle for the filtered water and ice.

$e$ represents a horizontal plate or diaphragm, which separates the water-chamber B from the filter-chamber C, and which is provided centrally with an aperture, $f$, and a tube, $g$, secured to the under side of the plate $e$ and depending into the filter-chamber C. The upper portion of the tube $g$ is filled by a cup, $h$, which is provided with a perforated bottom, and which rests by means of a flange formed around its upper edge upon the upper end of the tube $g$. This cup is covered by a perforated plate or strainer, $i$, which is secured to the upper projecting end of the tube $g$ by a screw-threaded collar, $i'$.

J represents ascending water-passages secured to the outer side of the tube $g$, and communicating with the lower end thereof by lateral openings $j$, the lower end of the tube $g$ being closed. The passages or tubes J terminate at a short distance below the plate $e$, so that the water will descend in the tube $g$ and ascend in the passages J, and escape from the upper ends of the latter into the surrounding filtering medium.

$k$ represents an annular plate, which forms the outer or marginal portion of the bottom of the filter-chamber C, and $l$ represents a perforated plate, which forms the central portion of the bottom of said filter-chamber, and which rests against the under side of the inner edge of the annular plate $k$. The perforated disk $l$ is secured in place by means of a central screw-bolt, $m$, which passes through the bottom of the tube $g$, and which is provided on the under side of the plate with a thumb-nut, $n$, or any other suitable fastening device. A spider, $o$, is preferably interposed between the nut $n$ and the plate $l$, to distribute the pressure over a large portion of the plate.

P represents a downwardly-projecting cylindrical flange secured to the under side of the annular plate $k$, and fitting within the lower water-chamber, D, so as to retain the upper portion, A, of the filter in its proper position on the same.

$q$ represents a faucet, whereby the water is withdrawn from the lower chamber, D, and R represents the cover which closes the upper water-chamber, B.

The cup $h$ is filled with one or more pieces of felt placed upon its perforated bottom, and with a sponge or other porous material. The lower portion of the filter-chamber C is preferably filled with fine gravel, the central portion with charcoal, and the upper portion with coarse gravel, as indicated respectively at $s\,s'\,s^2$ in Fig. 1. The water passes from the chamber B through the sponge or other porous material in the cup $h$, descends in the tube $g$, rises in the ascending passages or tubes J, escapes from the upper ends of the tubes J into the upper stratum of the filtering material in the chamber C. The water then percolates through the filtering material and escapes through the perforations in the plate $l$ into the receptacle D. In this manner the water is freed of its impurities. Upon removing the upper portion, A, of the filter from the lower portion, D, thereof, and disconnecting the plate $l$, the filtering material is readily removed from the chamber C when required. Upon removing the cap or strainer $i$ from the tube $g$ the filtering material contained in the cup $h$ and the cup itself are also easily removed and all parts exposed, so that they can be thoroughly cleaned.

I claim as my invention—

1. The combination, with the water-chamber B, of the filter-chamber C, having a perforated bottom, $l$, a tube, $g$, communicating with the water-chamber D, and provided with a cup, $h$, containing filtering material, and tubes J, surrounding the tube $g$, substantially as set forth.

2. The combination, with the water-chamber B and the filter-chamber C, provided with a removable bottom, $l$, of the tube $g$, tubes J, and fastening-bolt $m$, connecting the perforated bottom $l$ with the tube $g$, substantially as set forth.

3. The combination, with the water-chamber B and the filter-chamber C, provided with a removable bottom, $l$, of the tube $g$, tubes J, fastening-bolt $m$, and spider $o$, substantially as set forth.

A. F. SCHWALB.

Witnesses:
  JNO. J. BONNER,
  CHAS. F. GEYER.